United States Patent Office
2,799,817
Patented July 16, 1957

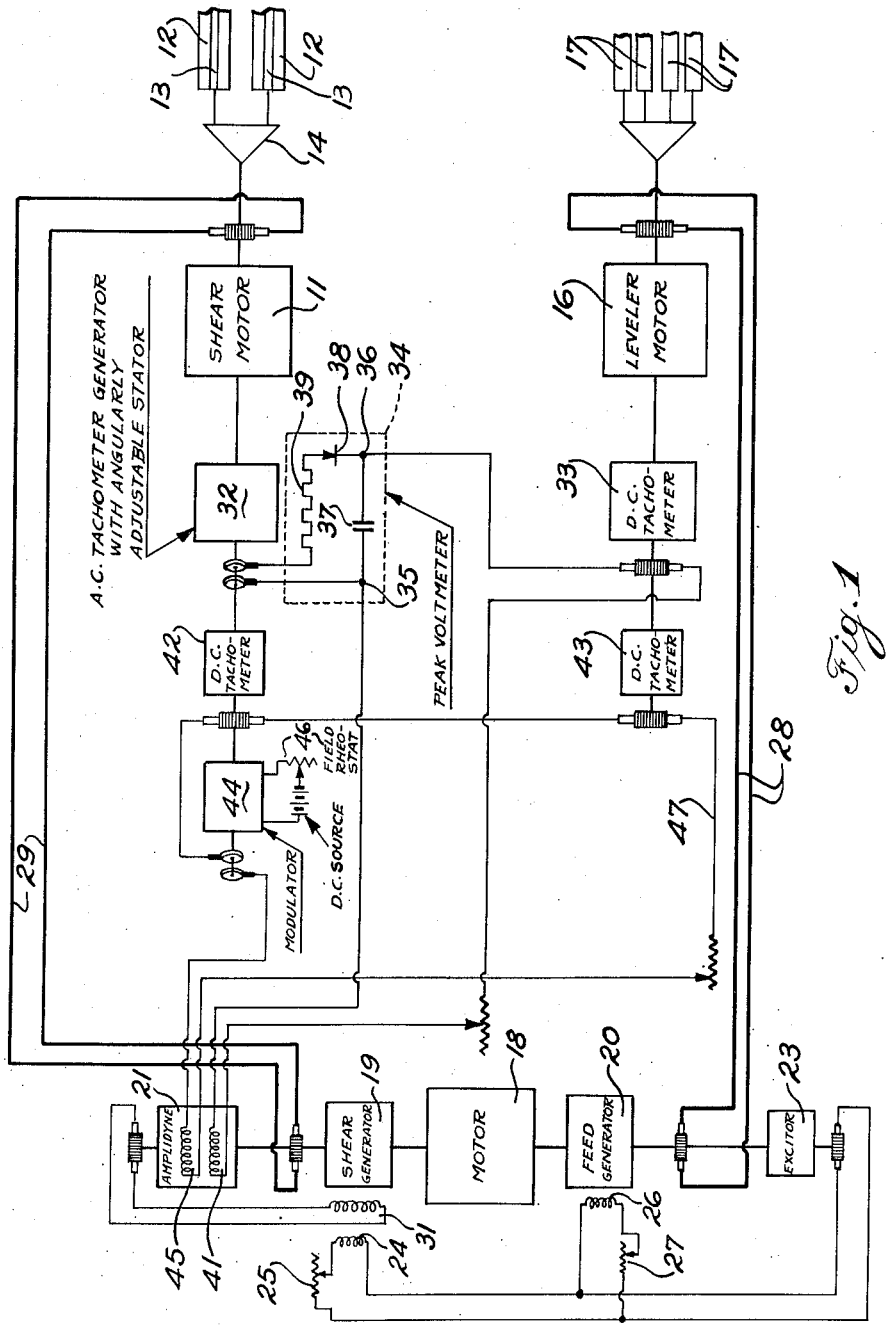

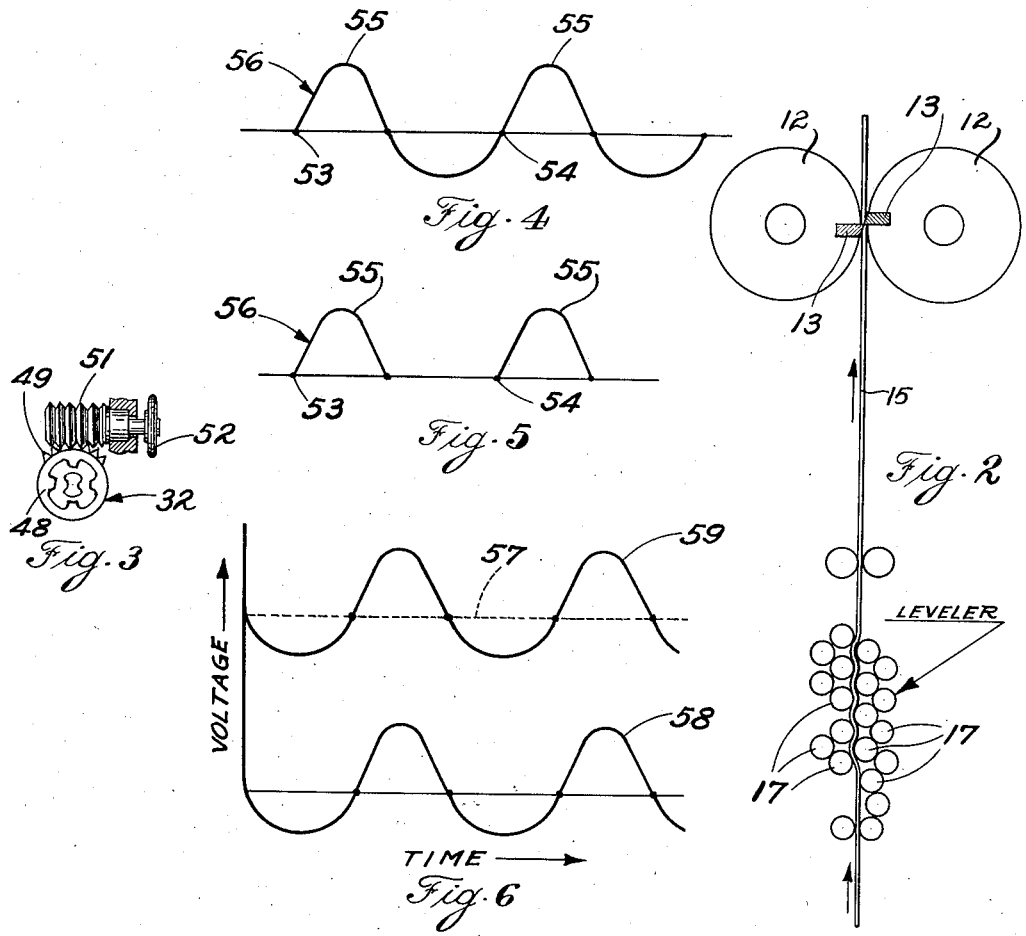

2,799,817

VARIABLE LENGTH OF CUT FLYING SHEAR

Karl W. Matthes and Elwin A. Matteson, Youngstown, Ohio, assignors to The Arms-Franklin Corporation, Youngstown, Ohio, a corporation of Pennsylvania Application January 14, 1953, Serial No. 331,274

17 Claims. (Cl. 318—146)

The present invention relates to control circuits especially for variable speed motors.

An object of the invention is to control the speed of a variable speed motor with a high degree of precision in relation to the speed of a master motor or other rotating member which may itself be subject to fluctuations in speed, as well as to introduce a predetermined cyclical variation in the speed of the variable speed motor. A further object is to provide convenient, reliable and accurate means for varying the extent of cyclical fluctuations of the speed of the variable speed motor.

Still another object of the invention is to accomplish reliable control of the relationship between the speed of the variable speed motor at a predetermined time in its operating cycle and the speed of the master motor or rotating member.

Another object of the invention is to provide a simple, reliable, easily adjustable arrangement for electrically controlling the speed of a flying shear motor used in conjunction with a motor driving a leveler or feed or pinch rolls supplying strip material to a flying shear so that the speed of the shear motor may be different from that of the leveler or feed motor and may be varied cyclically but smoothly in the course of a single revolution of the shear blade member in order that adjustments may be made in the length of strip passed through the shear in the interval between action of the shear blades, thus permitting adjustments in the length of strip cut.

Other and further objects, features and advantages of the invention will become apparent as the description proceeds.

In carrying out the invention in accordance with a preferred form thereof in connection with a flying shear of the revolving drum type in which knives or blades are carried by a pair of rotating revolving drums or shafts in such a manner that a stroke or cut is made once for each revolution of the two drum shafts, we utilize a variable-voltage motor-generator system or the like, for supplying armature current to the leveler or feed motor and to the shear motor. Although the speed of the leveler motor may be varied in order to change the speed with which strip is fed, in the course of any given setup the speed of the leveler motor remains substantially constant. Nevertheless, fluctuations in the speed of the leveler motor may take place as a result of variations in load, line voltage, the speed of the motor driving the variable-voltage system and the like, and a control is so arranged as to cause the speed of the shear motor to be adjusted in accordance with any fluctuations which may take place in the speed of the leveler motor.

In order to provide control signals responsive to the speeds of the motors tachometer generator means are provided. For simplicity in the explanation of the invention a pair of tachometer means are shown for the leveler or feed motor, although the invention is not limited thereto and a single direct current tachometer may be employed in conjunction with the leveler motor.

The shear motor is also provided with tachometer generator means, including preferably an alternating-current tachometer generator utilized for the control of maximum speed of the shear motor, and a direct-current tachometer generator utilized for the control of the instantaneous speed of the motor. An A.-C. modulator which is driven by the shear motor is provided for introducing signals in the circuit of the direct-current tachometer generators on the shear motor and leveler motor shafts for bring about cyclical variations in the shear motor speed.

An amplidyne type of direct-current amplifying device is mounted on the shaft of the variable-voltage generator system and may be provided with dual fields. One of the fields is energized by a series circuit consisting of the A.-C. modulator and the opposed D.-C. tachometers of the shear-motor and the leveler-motor shafts. In consequence cyclical variations in the amplidyne output are supplied to a control field of the shear generator for cyclically varying the armature voltage and speed of the shear motor during each rotation thereof.

A peak voltage output device, including resistance for eliminating inductive effects is provided for the alternating-current tachometer generator so that an output signal is produced responsive to the maximum speed of the shear motor. This signal is supplied in series opposition to the output of one of the direct-current tachometer generators of the leveler motor to another field winding of the D.-C. amplifier device or amplidyne so as to bring out speed corrections in the event that there is a deviation of the peak speed of the shear motor from the speed of the leveler motor in order that the cut will always take place when the strip speed and the tangential blade speed coincide. The angular position of the stator of the alternating-current tachometer generator is such that the peak voltage is produced when the shear stroke takes place. The amplidyne field winding in relation to the output of the peak voltage responsive device and the tachometer generator opposing it is made considerably stronger than the other amplidyne field winding in order that this effect will take precedence over the cyclical instantaneous speed varying control whenever any deviation tends to take place between the speed of the leveler motor and the peak speed of the shear motor.

A better understanding of the invention will be afforded by the following detailed description considered in conjunction with the accompanying drawings, in which:

Fig. 1 is a schematic circuit diagram of an embodiment of the invention;

Fig. 2 is a schematic elevation of mechanical apparatus including leveler and feed rolls and flying shear mechanism, the drive motor for which may be controlled by a control circuit of the type illustrated in Fig. 1;

Fig. 3 is a fragmentary diagram illustrating the mechanical construction of one of the tachometer generators employed in the control of maximum speed of the shear driving motor;

Fig. 4 is a graph illustrating the wave form of the output voltage of the tachometer generator of Fig. 3;

Fig. 5 is a graph corresponding to Fig. 4 illustrating the effect of a rectifier in cutting off negative loops of the wave of Fig. 4;

Fig. 6 is a graph illustrating speed relationship between the shear motor and the leveler or feed motor and the corresponding voltage relationships of associated tachometer generators as well as the principle of operation involved in producing cyclical variation in the speed of the shear motor while maintaining the speed under the control of the speed of a leveler motor;

Fig. 7 is a fragmentary circut diagram corresponding to Fig. 1 illustrating a simplified circuit embodiment.

Like reference characters are utilized throughout the drawings to designate like parts.

In the embodiment of Fig. 1 a shear motor 11 is illustrated for driving a pair of cooperating drums 12 carrying shear blades or knives 13. Suitable means such as gears 14 are provided for connecting both drums 12 to the shaft of the shear motor 11. For leveling strip material such as strip steel 15 for example, and feeding it to the shear blades 13, a motor 16 is provided driving pinch and leveler rolls 17. As the rolls 17 for leveling the strip and feeding it are well known to those skilled in the art they need not be described or illustrated in detail. The flying shear with blades 13 likewise may be of the type well known to those skilled in the art and therefore need not be described and illustrated in detail. In accordance with my invention, however, instead of driving the shear blade carrying drums 12 at a uniform speed corresponding to the peripheral speed of the leveler roll 17 provision is made for varying the speed of the drums 12 in the course of the cycle of rotation so that the length of strip cut may be varied. This is done while controlling the speed of the shear motor 11 in such a manner that the peripheral speed of the drums 12 at the instant of shearing corresponds to the speed of the strip 15 at the instant. By causing the drums 12 carrying the shear blades 13 to slow down after the stroke has been made, speeding up again to the original speed before the next stroke is made, the length of strips cut may be increased. Thus by varying the maximum change in speed, variations in the lengths of the strip cut by the flying shear may be made without necessitating the substitution of different sets of shear drums of a different diameter for every different desired length of strip to be cut and without inducing difficulty from variations of the surface speed of the feed and the peripheral speed of the shear blades at the time of the shearing stroke.

In order that the speed of the shear motor 11 may be varied cyclically but nevertheless controlled in relationship to the leveling motor 16, a suitable current supply system is provided in which suitable variations in voltage and current supplied to the shear motor 11 may be produced while employing control circuits carrying relatively small currents. For example a variable-voltage type of system may be employed utilizing a main drive motor 18 driving a pair of generators 19 and 20 for supplying armature current to the shear motor 11 and the leveler motor 16 respectively, and preferably driving also a dynamoelectric type of direct-current amplifier such as a dynamoelectric unit 21 such as sold under the trade name of Amplidyne. An exciter 23 may also be driven on the same shaft of the main drive motor 18 for supplying field current to the shear generator 19 and the leveler generator 20, as well as other auxiliary circuits as desired. As indicated schematically, the shear generator 19 is provided with a main field 24 to be supplied from the exciter 23 through a rheostat 25 for making major adjustments in the approximate average or maximum speed of the shear motor 11. Likewise the leveler generator 20 is provided with a field winding 26 supplied from the exciter 23 through a rheostat 27 for adjusting the output voltage of the leveler generator 20 and thereby adjusting the normal constant speed for fixed load of the leveler motor 16. As shown by the heavy lines 28 representing power circuits the armatures of the leveler generator 20 and the leveler motor 16 are connected together. Likewise as shown by the heavy lines 29 the armatures of the generator 19 and the shear motor 11 are connected together.

Although, if desired, the shear generator 19 may be provided with a single field winding with control current supplied thereto superimposed upon that supplied by the exciter 23, preferably and especially for convenience in explanation of the principle of operation, the shear generator 19 is shown with an auxiliary field winding 31 connected to the armature of the amplidyne or dynamoelectric current control device 21.

As will be explained hereinafter, means are provided for cyclically varying, for example, reducing the voltage output of the shear generator 19 in order to vary smoothly, for example, depress the speed of the shear motor 11 along a sinuous curve during the intervals between instants when the shear blades 13 make their cutting stroke. In addition thereto means are provided for assuring that the speed of the shear motor 11 when the cutting stroke is being made will correspond to that of the leveler motor 16. Preferably the arrangement is such that the stroke is made when the shear motor 11 is at maximum speed.

For the purpose of conforming the maximum speed of the shear motor 11 to the speed of the leveler motor 16 and making whatever corrections are necessary in the event of fluctuation in the speed of the leveler motor 16 over a period of time, signal generating units are mounted on the shafts of the motors 11 and 16 for supplying control current to the amplidyne 21. As shown schematically an alternating current tachometer generator 32 is connected to the shear motor 11 and a direct current tachometer generator 33 is connected to the leveler motor 16 being, for example, on the same shaft. For supplying an output voltage corresponding to the maximum speed of the shear motor 11 which is represented by the maximum voltage of the alternating current tachometer generator 32, a peak voltage responsive unit 34 with output terminals 35 and 36 is connected to the armature of the alternating current tachometer generator 32.

In order that the device 34 will respond to the speed of the shear motor 11 when the cutting stroke is being made and not to that when the shear blades are in a position 180° away from the cutting position the peak voltage device 34 is so constructed so as to respond only to output voltage responses of a given polarity. The device 34 for example may be of the general type described in Patents #1,611,716 to Brown, 1,209,766 to Sharp or 2,378,846 to Hansell. This type of apparatus is indicated schematically in the drawing by a condenser 37 connected to the armature of the alternating tachometer generator 32 in a series with a single wave rectifier 38 with output terminals 35 and 36 being across the condenser 37. It will be understood that the condenser 37 is constructed with a relatively high capacity and low leakage so that a voltage will tend to be maintained therein equal to the maximum value of the half wave loops of a given polarity of the generator 32. Moreover, in order to retain the output circuit of the tachometer generator 32 relatively unresponsive to inductive effects and therefore to follow variations in speed faithfully, the circuit thereof is preferably made non-inductive utilizing relatively low reactance windings and having resistance 39 interposed in order to insure a non-reactive circuit characteristic.

In order to enable the peak speed of the shear motor 11 to be balanced against the substantially constant speed of the leveler motor 16 the amplidyne 21 is provided in addition to any desired conventional windings, not shown, such as anti-hunt and load control field windings with a field winding 41 to which the output of the direct-current tachometer 33 and the peak speed device 34 is connected in series opposition.

If desired, the means for introducing a cyclical variation in the speed of the shear motor 11 may be provided with a circuit independent of that of the units 32 and 33. To this end separate direct-current tachometer generators 42 and 43 may be mounted on the shafts of the shear motor 11 and the leveler motor 16 respectively, and an alternating current generator 44 serving as a modulator is also mounted on the shaft of the shear motor 11. For balancing the effects of the units 42, 43 and 44, the amplidyne 21 is provided with a second field winding 45 to which the tachometer generators 42 and 43 are connected in series opposition with the armature of the alternating current modulator 44 included in the series circuit. In order to enable the magnitude of the cyclical variations in speed of the shear motor 11 to be adjusted and thereby to permit changes in the length of strip cut to be made, means are provided for adjusting the magnitude of the effect of the modulator 44 on the circuit of the amplidyne field winding 45. For example, the modulator 44 may be provided with a field rheostat 46 connected to a source of direct current which may, if desired, be the exciter 23. However, if desired, as will be described more in detail hereinafter, the effect of variations in speed of the leveler motor 16 for different feed speeds when the speed adjustment 27 is changed, may be substantially compensated by supplying the field winding of the modulator 44 from a tachometer generator driven from the shaft of the leveler 16 instead of from a constant voltage source. For example, if desired, the field leads 47 of the unit 44 may be connected across the output of the tachometer 43.

For adjustment of the angular position of the shear blade drums 12 at the instant of the maximum speed of the shear motor 11 the alternating-current generator units 32 and 44 are made adjustable in phase. As shown in Fig. 3, the unit 32 is provided with a stator 48 rotatably mounted in a cradle, not shown, so as to be rotatable about the rotation axis of the shaft, with gear teeth 49 mounted on the stator, adapted to cooperate with a phase-setting mechanism such as a worm gear 51, for example, having an adjusting wheel or handle 52.

Assuming that the gears 14 have a 1 to 1 ratio, the shear blades 13 will make a complete revolution for each revolution of the shear motor 11. In this case the unit 32 is in the form of a two-pole alternator, which will produce a positive half wave loop and a negative half wave loop for each rotation of the shear motor 11 and the shear blades 13. This is illustrated in Fig. 4, where the distance between the points 53 and 54 represents the time required to make a complete revolution of the shear blades 13. It will be understood that for a generator shaft rotating at a uniform speed the instant at which the positive half wave has its peak value corresponds to the instant when the shaft is in a predetermined angular position, that is when there is a predetermined relationship between the field and the armature. In order to cause this peak value to take place at the instant when blades 13 are making a cutting stroke, the adjusting wheel 32 is rotated until the instant of cutting corresponds to the point 55 in the wave shown in Fig. 4. This may be done by the use of an oscilloscope or other suitable testing equipment as is well known by those skilled in the art. Since, however, the mechanism as described is provided for depressing the speed of the shear motor 11 during the intervals between the peak speeds points 55, the wave form 56 of the unit 32 will depart somewhat from a sine wave, the positive wave loops being somewhat more peaked and the negative wave loops being somewhat flatter and broader than a true sine wave. Nevertheless, in order to assure the absence of any effects of the negative wave loops these are cut off by the rectifier 38 as shown in Fig. 5. The units 32 and 44 are so arranged as to produce voltages in phase with each other.

The tachometer generator 33 is so designed or adjusted that its voltage output equals the peak value of the voltage at the instant 55 of the wave 56 when the peak speed of the shear motor 11 corresponds to the substantially constant speed of the leveler motor 16.

The apparatus may, if desired, also be so arranged as to cut when the shear motor is running at minimum speed instead of maximum for cutting shorter lengths of strip instead of longer. In this case the stator 48 is rotated to a position 180° from that previously described and the terminals of the rectifier 38 are reversed. Whether the shear blades cut when the shear motor is running at maximum speed or at minimum speed the slope of the velocity or speed curve is zero at the time of cut; consequently, the acceleration of the shear motor and the shear blades passes through zero at this point resulting in absence of force acting on the shear blade. In consequence, there is no distortion of the sheet while it is being cut and wear on the shear is held to a minimum. The generator 32 may be eliminated by supplying the peak voltage responsive unit 34 in shunt with the output from the A.-C. modulator 44, in which case design considerations become more difficult.

In the circuit illustrated in Fig. 1 where the units 42, 43 and 44 are provided with a circuit independent from units 33 and 34, the tachometer generators 42 and 43 are so designed so as to produce the same voltage output for the same speed. If the field rheostat 46 of the alternating current modulator 44 is adjusted for zero output, the tachometer generators 42 and 43 will tend to maintain the speed of the shear motor 11 equal to the constant speed of the leveler motor 16 by supplying current to the amplidyne field winding 45 in response to any deviation so as to cause the amplidyne 21 to produce correcting current in the shear generator field winding 31 until the two speeds had been brought into uniformity. Then when it is desired to produce a cyclical variation in the speed of the shear motor 11 the field rheostat 46 is adjusted to supplying alternating current output in the modulator 44 the magnitude of which depends upon the desired extent of variation in speed.

From the foregoing it will be seen that the field winding 41 of the amplidyne 21 receives an adjustment to be of such a value as to cause the amplidyne 21 to provide the shear generator 19 with a component of field current which will maintain the long range speed of the shear motor 11 in conformity with the speed of the leveler motor 16. This serves to conform the peak speed of the shear (when it engages strip) to the linear speed of the strip drawn through the leveler 17.

On the other hand, the variations in cyclical instantaneous speed of the shear motor 11, in order to enable changes to be made in the length of strip cut, are accomplished by the cyclical variation of the current supplied to the winding 45 of the amplidyne 21. The windings 41 and 45 act in the same field structure so that the magnetic effects supplement each other in the effect on the current output to the field winding 31 of the shear generator 19. It will be understood that the shear generator 19 receives its basic field excitation from the winding 24 energized by the exciter 23 so that the current output of the amplidyne 21 supplying the supplemental field 31 is merely for the purpose of making requisite adjustments in the basic field excitation of the shear generator 19.

The voltage of the shear generator 19 determines the speed of the shear motor 11 and causes the speed of the shear motor 11 to follow such voltage fluctuations closely, not withstanding the inertia of the rotary system of the shear motor 11, because of the heavy currents and corresponding heavy power fluctuations involved, which are accomplished by means of the cyclically varying system described.

The current supply to the winding 41 comprises the output of the direct-current tachometer 33 in series opposition to the output of the peak voltmeter unit 34, which produces a current proportional to the peak value of the voltage output of the alternating current tachometer generator 32. Since the voltage output of the tachometer generator 32 is proportioned to the speed of the shear motor 11, its peak value is in proportion to the average speed over several successive revolutions as distinguished from instantaneous speed.

The speed of the leveler motor 16 is kept as nearly constant as posisble. The output of the peak voltmeter 32 and the tachometer generator 33 act in opposition. Consequently the variations in the average speed of the shear motor 11, considered over several revolutions, result in a current in the winding 41 of such polarity as may be necessary to bring the average speed of the shear motor 11 in conformity with that of the leveler motor 16.

The amplidyne field winding 45 for introducing the cyclical speed variation component in the speed of the shear motor 11 is energized by the outputs of the tachometer generator 42 and 43 in series opposition and in series also with the output of the modulator alternating-current generating device 44. Since the devices 44 and 42 (with the generator 32) are mounted on the same shaft as the shear motor 11, the voltage output of the tachometer generator 42 is proportioned to the instantaneous speed of the shear motor 11 and the tachometer generator 43 merely produces a voltage proportioned to the speed of the leveler motor 16, which is held as nearly constant as possible. Disregarding the modulator 44, the effect of the opposing voltages of the tachometer generators 42 and 43 would be to produce a current flow in the winding 45 whenever there was a deviation between the instantaneous speeds of the shear motor 11 and the leveler motor 16, thus supplementing the balancing effect of the amplidyne winding 41.

However, in the circuit as illustrated, the modulator 44 is also in a series with the conductor 47 connecting the tachometer generators 42 and 43 to the amplidyne winding 45. Since the modulator 44 is an alternating current device it produces a current varying through a complete cycle for each revolution of the shear motor 11, producing a current represented by the wave 58 in Fig. 6. Superimposed upon the unbalance in output between the generators 42 and 43 there is produced a fluctuation in the direction of current represented by the wave 59 in Fig. 6. Since the current supply to the winding 45 would thus fluctuate cyclicly with a constant speed of the shear motor 11, very heavy armature currents would be produced in the shear motor 11 tending to increase and decrease its speed during each revolution thereof, the actual instantaneous speed being thus effected. In consequence, the shear motor 11 fluctuates cyclicly in speed increasing and decreasing during each revolution sufficiently to cause such variations in the output of the instantaneous value of current from the tachometer 42 to balance the fluctuations of the modulator 44. Accordingly, the fluctuating voltage wave 59 represents also the speed fluctuations of the shear motor 11.

For the specific circuit arrangement just described the voltage output of the tachometer generator 43 is represented by the constant altitude line 57 in Fig. 6 and the voltage output of the modulator 44 is represented by the alternating wave 58. The resultant of the two waves is the fluctuating unidirectional wave 59. The circuit of the amplidyne field winding 45 would then be unbalanced whenever the voltage output of the direct current tachometer 42 differed from the unidirectional fluctuating wave 59. Accordingly, current is caused to flow in the field winding 45 so as to produce a correcting current in the shear generator winding 31 serving to increase and decrease the speed of the shear motor 11 cyclically along a smooth sinuous speed curve so as to cause the output of the direct current tachometer 33 to conform to the fluctuating wave 59. In this type of arrangement the amplidyne winding 41 is made substantially greater in effect than the amplidyn winding 45, for example having a greater number of turns in relation to the current output of the units 34 and 33 so that the balancing of the peak speed of the shear motor 11 against the substantially constant speed of the leveler motor 16 is the dominating effect. In other words, minute deviation produces sufficient correction in the output of the shear generator to correct the peak speed of the shear motor 11. However, so long as these two effects are in balance with substantially no current flowing in the amplidyne field winding 41, the amplidyne field 45 is effective for producing the cyclical variations in speed referred to. The modulator 44 and the A.-C. generator 32 have their windings so mounted or adjusted as to produce in-phase waves, synchronized with the shear blades 13, so that the cut takes place when each wave is at peak value when tangential shear speed equals strip speed.

The two speed control circuits have been illustrated separately for the sake of simplicity in the explanation. It will be understood, however, that it is not necessary to employ separate tachometers 33 and 43 and separate amplidyne field windings 41 and 45. Instead a single amplidyne field winding 61 may be employed as illustrated in the sketch of Fig. 7 connected in series with the output of the modulator 44 to the serially opposed outputs of the device 34 and the direct-current generator 33.

Moreover, in order to avoid the necessity for making a new adjustment of the control circuits whenever it is deisred to change the speed of the leveler motor 16 by adjusting the rheostat 27 a circuit arrangement may be employed for eliminating one half of the voltage wave of the modulator 58 so that the fluctuating wave 59 is merely depressed from the line 57, representing the constant speed of the leveler motor 16. This may be accomplished by interposing a rectifier unit 63 in the output of the modulator 44 as illustrated in Fig. 7. The unit 63 comprises a condenser 64 and a half wave rectifier 65 connected in series, with the output of the unit taken from the terminals 66 and 67 connected across the rectifier 65.

Certain embodiments of the invention and certain methods of operation embraced therein have been shown and particularly described for the purpose of explaining the principle of operation of the invention and showing its application, but it will be obvious to those skilled in the art that many modifications and variations are possible, and it is intended therefore, to cover all such modifications and variations as fall within the scope of the invention.

What is claimed is:

1. A control circuit for the motor of a flying shear of the revolving, knife-carrying drum type associated with a motor for driving a leveler, feeding strip material to the flying shear and arranged for adjustment of the length of strip cut, said control circuit comprising in combination with a variable voltage system having generators for supplying armature current to shear and leveler motors and having dual field windings for the shear generator, an amplidyne device having an armature circuit supplying one of the fields of said shear generator, having first and second field windings, an alternating current generator tachometer, a direct-current tachometer and an alternating current generator modulator all driven by the shear motor, the alternating current generator tachometer having an angularly adjustable stator, first and second direct current tachometers driven by the leveler motor, a peak voltage responsive device including means for cancelling inductive effects energized by the alternating current generator tachometer, said peak voltage device having an output connected in series opposition with one of said leveler motor direct-current tachometers to the first mentioned field windings of the amplidyne device, the second direct-current tachometer of the leveler motor being connected in series opposition with the direct current tachometer of the shear motor, and in series also with the A.-C. generator modulator and the second mentioned field winding of the amplidyne device, the first mentioned field winding being of considerably greater strength in relation to the current supplied thereto, whereby it has substantially greater effect on the output of the amplidyne and the amplidyne supplies correct field to the shear generator for increasing or decreasing as may be necessary, the speed of the shear motor, in order to equalize the peak instantaneous speed of the shear motor with the speed of the leveler motor, the interposition of the A.-C. modulator in the circuit of the shear motor, tachometer serving to produce cyclical variation in the instantaneous speed of the shear motor.

2. Apparatus as in claim 1 wherein the A.-C. modulator is provided with a field rheostat for varying the magnitude of the output thereof, whereby the extent of cyclical variation in speed of the shear motor may be adjusted to adjust the length of the strip passed during the intervals between actuation of the shear motor blades in order to vary the length of strip cut by the flying shear.

3. Apparatus as in claim 1 wherein the alternating-current generator, shear motor tachometer is provided with indexing mechanism for setting the angular position of the stator thereof at such a point that the peak value of the positive loop of the output wave corresponds to the instant when the shear blades cut.

4. A control circuit for the motor of a flying shear associated with a motor for driving means feeding strip material to the flying shear, said motor control circuit including in combination with a variable-voltage system having generators for supplying armature current to shear and feed motors and having dual field windings for the shear generator, a shear generator field control circuit including first and second control windings, an alternating-current generator tachometer, a direct-current generator tachometer and an alternating-current generator modulator all driven by the shear motor, the alternating-current tachometer having an angularly adjustable stator, first and second direct-current tachometers, driven by the feed motor, a peak-voltage responsive device including means for suppressing inductive effects, energized by the alternating-current generator tachometer, said peak-voltage device being connected in series opposition with one of said feed-motor direct-current generator tachometers to the first mentioned control winding of the field control circuit, the second direct-current tachometer of the feed motor being connected in series opposition with the direct-current tachometer of the shear motor, and in series also with the alternating-current generator modulator and the second mentioned control winding of the field control circuit, the first mentioned control winding being of considerably greater strength than the other whereby it has greater effect on the field control circuit and the latter supplies correcting field to the shear generator for increasing or decreasing, as may be necessary, the speed of the shear motor in order to equalize the peak, instantaneous speed of the shear motor with the speed of the feed motor, the interposition of the alternating-current modulator in the circuit of the shear motor direct-current tachometer serving to produce cyclical variations in the instantaneous speed of the shear motor.

5. A control circuit for the motor of a flying shear associated with a motor for driving means feeding strip material to the flying shear, said motor control circuit including in combination with a variable-voltage system having generators for supplying armature current to shear and feed motors, a shear generator field control circuit including first and second control windings, an alternating current generator tachometer, a direct-current generator tachometer and an alternating-current generator modulator all driven by the shear motor, first and second direct-current tachometer, driven by the feed motor, a peak voltage responsive device including means for suppressing inductive effects, energized by the alternating current generator tachometer, said peak voltage device being connected in series opposition with one of said feed motor direct-current generator tachometers to the first mentioned control winding of the field control circuit, the second direct current tachometer of the feed motor being connected in series opposition with the direct current tachometer of the shear motor, and in series also with the alternating current generator modulator and the second mentioned control winding of the field control circuit, the first mentioned control winding being of considerably greater strength than the other whereby it has greater effect on the field control circuit and the latter supplies correcting field to the shear generator for increasing or decreasing, as may be necessary, the speed of the shear motor in order to equalize the peak, instantaneous speed of the shear motor with the speed of the feed motor.

6. A control circuit for the motor of a flying shear associated with a motor for feeding strip material to the flying shear, said control circuit comprising in combination with a variable-voltage system having generators for supplying armature current to shear and feed motors, a field control device supplying the shear generator with field excitation having control electric winding means, alternating-current generating means and a direct-current tachometer driven by the shear motor, direct-current generating means driven by the feed motor, a peak voltage responsive device energized by the alternating current generating means, said peak voltage device having an output connected in series opposition with the feed motor, direct-current generating means to the said control-winding means of the field control device, the direct-current tachometer of the shear motor being connected in series opposition with the direct-current generating means of the feed motor and in series also with the alternating generating means of the shear motor and the control winding means of the field control device, whereby the field control device supplies correcting field to the shear generator for increasing or decreasing, as may be necessary, the speed of the shear motor in order to equalize the peak instantaneous speed of the shear motor with the speed of the feed motor, the interposition of alternating-current generating means in the circuit of the shear-motor, direct-current tachometer and the feed-motor, direct-current generating means serving to produce cyclical variation in the instantaneous speed of the shear motor.

7. A control circuit for the motor of a flying shear associated with a motor for feeding strip material to the flying shear, said control circuit comprising current supply means for the shear motor controlling the speed thereof in response to variations in current, said current-supply means having a control winding, a direct-current tachometer and an alternating-current generator, driven by the shear motor, a direct-current tachometer driven by the feed motor, said direct-current tachometers being connected in series opposition in a circuit including the alternating-current generator and the said control winding, the interposition of the alternating current generator in said circuit serving to produce cyclical variation in the instantaneous speed of the shear motor.

8. A control circuit for the motor of a flying shear associated with a motor for feeding strip material to the flying shear, said control circuit comprising current supply means for the shear motor controlling the speed thereof in response to variations in current, a control winding, a direct-current tachometer and an alternating-current generator tachometer driven by the shear motor, means for introducing fluctuations in the instantaneous speed of the shear motor, a peak voltage responsive device energized by the alternating-current generator tachometer, a direct-current tachometer driven by the feed motor connected in series opposition to said peak voltage device in a circuit including said control winding whereby correcting field is supplied to the shear motor for increasing or decreasing, as may be necessary, the speed of the shear motor in order to equalize the peak instantaneous speed of the shear motor with the speed of the feed motor.

9. A control circuit for the motor of a flying shear associated with a motor for feeding strip material to the flying shear, said control circuit comprising means for equalizing the peak instantaneous speed of the shear motor with the speed of the feed motor and means for introducing a cyclical variation in the speed of the shear motor comprising alternating-current generating means synchronous with the shear motor, means producing instantaneous voltage proportional to the instantaneous speed of the shear motor, means producing instantaneous voltage proportional to the instantaneous speed of the feed motor, said voltage producing means being connected serially in opposition in a circuit including the alternating-current generating means for producing a control-circuit current proportional to the deviation between the voltage output of one of said voltage producing means and the instantaneous sum of the voltage outputs of the other voltage producing means and the alternating-current generating means.

10. A control circuit for the motor of a flying shear adapted to vary cyclically in speed, associated with a motor for feeding strip material to the flying shear, said control circuit comprising in combination alternating-current generating means driven by the shear motor, peak voltage responsive means connected thereto, direct-current generating means driven by the feed motor serially connected in opposition to the peak voltage device for supplying a control current proportional to deviation between the peak instantaneous speed of the shear motor and the speed of the feed motor for equalizing said peak instantaneous speed and the feed motor speed.

11. A control circuit for the motor of a flying shear adapted to vary in speed in accordance with an undulatory speed curve, associated with a motor for feeding strip material to the flying shear, said control circuit comprising in combination alternating-current generating means driven by the shear motor, peak voltage responsive means connected thereto, direct-current generating means driven by the feed motor connected to oppose the peak voltage device for supplying a control current proportional to the deviation between the speed of the feed motor and the instantaneous speed of the shear motor at a substantially zero-slope point of the undulatory speed curve thereof for equalizing with the feed motor speed said instantaneous speed of the shear motor at the said zero-slope point.

12. Apparatus as in claim 9 wherein a rectifier is interposed in the output circuit of the alternating generating means for causing the cyclical variations in speed to take place only in one direction.

13. Apparatus as in claim 12 wherein the polarity of the rectifier is such as to cause the output of the rectifier to oppose the output of the means producing voltage proportional to shear motor speed.

14. A control circuit for the motor of a flying shear associated with a motor for feeding strip material to the flying shear, said control circuit comprising a current responsive device determining the shear motor speed having control winding means, an alternating-current generator connected to the shear motor, a direct-current generator connected to the shear motor, a direct-current tachometer generator connected to the feed motor, a peak voltage output device connected to the alternating-current generator having output terminals serially connected in opposition to the direct current generator of the shear motor in a circuit including the control winding means, the said direct-current generators also being serially connected in opposition in a circuit including the alternating current generator and the control winding means for introducing cyclical variations in the shear motor speed.

15. A control circuit for a motor of a flying shear comprising a curernt-conducting winding, the magnitude of current in which controls motor speed, connections from said winding to a current source and a wave generator interposed in circuit therewith for causing fluctuations of current in the control winding and thereby causing cyclical variation in shear motor speed, a motor for feeding sheet material to the flying shear, said current source having means for adjusting the output thereof for adjusting the base speed of the shear motor, said current source also includes means for supplying a current to said winding proportional to the speed of the feeding motor for making the adjustment in the current source output dependent upon feed motor speed and thereby causing the adjustment of base speed of the motor to take place in accordance with the feed motor speed.

16. Apparatus as in claim 15 wherein means are provided for adjusting the maximum fluctuation of the current in the said winding to adjust the maximum change in speed during the speed change cycle.

17. Apparatus as in claim 16 wherein means are provided for adjusting the rate of change of magnitude of the output of said wave generator for varying the rate of change of speed of the shear motor and thereby varying the length of cut of the shear.

References Cited in the file of this patent

UNITED STATES PATENTS

| | | |
|---|---|---|
| 1,071,522 | Kramer | Aug. 26, 1913 |
| 1,862,354 | Winne | June 7, 1932 |
| 2,023,243 | Rhea et al. | Dec. 3, 1935 |
| 2,298,877 | Edwards et al. | Oct. 13, 1942 |

FOREIGN PATENTS

| | | |
|---|---|---|
| 304,212 | Great Britain | Sept. 12, 1929 |
| 426,236 | Great Britain | Mar. 29, 1935 |